(12) United States Patent
Cho

(10) Patent No.: US 12,202,302 B2
(45) Date of Patent: Jan. 21, 2025

(54) TIRE PRESSURE DETECTION SYSTEM WITH SEPARATED ANTENNAS

(71) Applicant: Shih-Chin Cho, Taipei (TW)

(72) Inventor: Shih-Chin Cho, Taipei (TW)

(73) Assignee: SYSGRATION LTD.

( * ) Notice: Subject to any disclaimer, the term of this patent is extended or adjusted under 35 U.S.C. 154(b) by 122 days.

(21) Appl. No.: 18/203,071

(22) Filed: May 30, 2023

(65) Prior Publication Data

US 2023/0302857 A1 Sep. 28, 2023

Related U.S. Application Data

(63) Continuation-in-part of application No. 17/378,757, filed on Jul. 18, 2021, now abandoned.

(51) Int. Cl.
*B60C 23/04* (2006.01)
*G01L 17/00* (2006.01)
*H04W 4/48* (2018.01)
*H04W 4/80* (2018.01)

(52) U.S. Cl.
CPC ...... *B60C 23/0479* (2013.01); *B60C 23/0452* (2013.01)

(58) Field of Classification Search
CPC .................................................. B60C 23/0452
See application file for complete search history.

(56) References Cited

U.S. PATENT DOCUMENTS

| | | | |
|---|---|---|---|
| 2010/0305809 A1* | 12/2010 | Audisio | B60C 23/0433 701/31.4 |
| 2015/0029016 A1* | 1/2015 | Lesesky | B60C 23/0486 340/442 |
| 2015/0224830 A1* | 8/2015 | Chen | B60C 23/0455 340/447 |
| 2017/0136834 A1* | 5/2017 | Chong | B60C 23/0433 |
| 2018/0154708 A1* | 6/2018 | Yang | B60C 23/0452 |

* cited by examiner

*Primary Examiner* — Joseph H Feild
*Assistant Examiner* — Pameshanand Mahase

(57) ABSTRACT

A tire pressure detection system with separated antennas includes a detection end and a receiving end. The detection end includes tire pressure detectors to detect the tire to obtain the information of tire status. The tire pressure detectors output the information of the tire status in the form of radio frequency signal and Bluetooth signal. In addition to the transmission to the built-in tire-pressure receiving device, the information of the tire status also can be displayed on the in-vehicle audio-video device and the user's mobile device.

7 Claims, 7 Drawing Sheets

TIRE PRESSURE DETECTION SYSTEM WITH SEPARATED ANTENNAS

CROSS REFERENCE TO RELATED APPLICATIONS

This application is a continuation-in-part of U.S. application Ser. No. 17/378,757 filed Jul. 18, 2021. The entirety of said Application is incorporated herein by reference.

BACKGROUND OF THE INVENTION

Fields of the Invention

The present invention relates to a tire pressure detection system, and more particularly, to a tire pressure detection system with separated antennas.

Descriptions of Related Art

The existing tire pressure detectors typically only have a single wireless signal transmission mode for either radio frequency signal or Bluetooth signal. These signals, conveying the detected tire status, are transmitted to a tire-pressure receiving device installed in the vehicle, thus providing users with the pressure and temperature information of the tire.

Conventionally, when users want to use in-vehicle audio-visual devices or mobile devices (hereafter referred to as external devices) as reading/display devices for presenting the tire information, a signal receiving converter needs to be installed in the vehicle because the wireless signals received by external devices were different in type from the signals from the tire pressure detector. However, the signal receiving converter not only takes up space within the vehicle but also requires an additional power supply, which often occupies the cigarette lighter power supply socket or power socket and results in inconvenience in its usage.

SUMMARY OF THE INVENTION

The present invention relates to a tire pressure detection system with separated antennas, in which both types of signal outputs, radio frequency and Bluetooth, are provided by tire pressure detectors. These signals can be received by tire-pressure receiving devices, in-vehicle audio-visual devices and mobile devices to display tire status information, thus addressing the aforementioned conventional technical issues.

In order to achieve the aforementioned objectives and functions, a tire pressure detection system with separated antennas is provided, comprising a detection end and a receiving end.

The detection end includes a plurality of tire pressure detectors, while the receiving end includes a tire-pressure receiving device, an in-vehicle audio-video device and a mobile device.

Each of the tire pressure detectors includes a tire status detection unit, a main control unit, a radio frequency circuit and a Bluetooth circuit. The main control unit is electrically connected to the tire status detection unit, the radio frequency circuit and the Bluetooth circuit. The tire status detection unit can continuously detect the tire status. The main control unit converts the information regarding the tire status into a control transmission signal for output.

The radio frequency circuit includes a radio frequency control unit, a radio frequency matching unit and a radio frequency antenna. The radio frequency matching unit is electrically connected to the radio frequency control unit and the radio frequency antenna. The radio frequency control unit receives and converts the control transmission signal into a radio frequency signal. The radio frequency matching unit adjusts the control transmission signal to match a pre-set radio frequency impedance. The radio frequency antenna matches the radio frequency impedance for maximum power transfer, and outputs the radio frequency signal within a corresponding frequency band to any one or any two or more of the receiving device, the in-vehicle audio-video device and the mobile device so as to display the tire status.

The Bluetooth circuit includes a Bluetooth control unit, a Bluetooth matching unit and a Bluetooth antenna. The Bluetooth matching unit is electrically connected to the Bluetooth control unit and the Bluetooth antenna. The Bluetooth control unit receives and converts the control transmission signal into a Bluetooth signal. The Bluetooth matching unit tunes the control transmission signal to match a pre-set Bluetooth impedance. The Bluetooth antenna matches the Bluetooth impedance for maximum power transfer and outputs the Bluetooth signal within a corresponding frequency band to any one or any two or more of the receiving device, the in-vehicle audio-video device and the mobile device so as to display the tire status.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
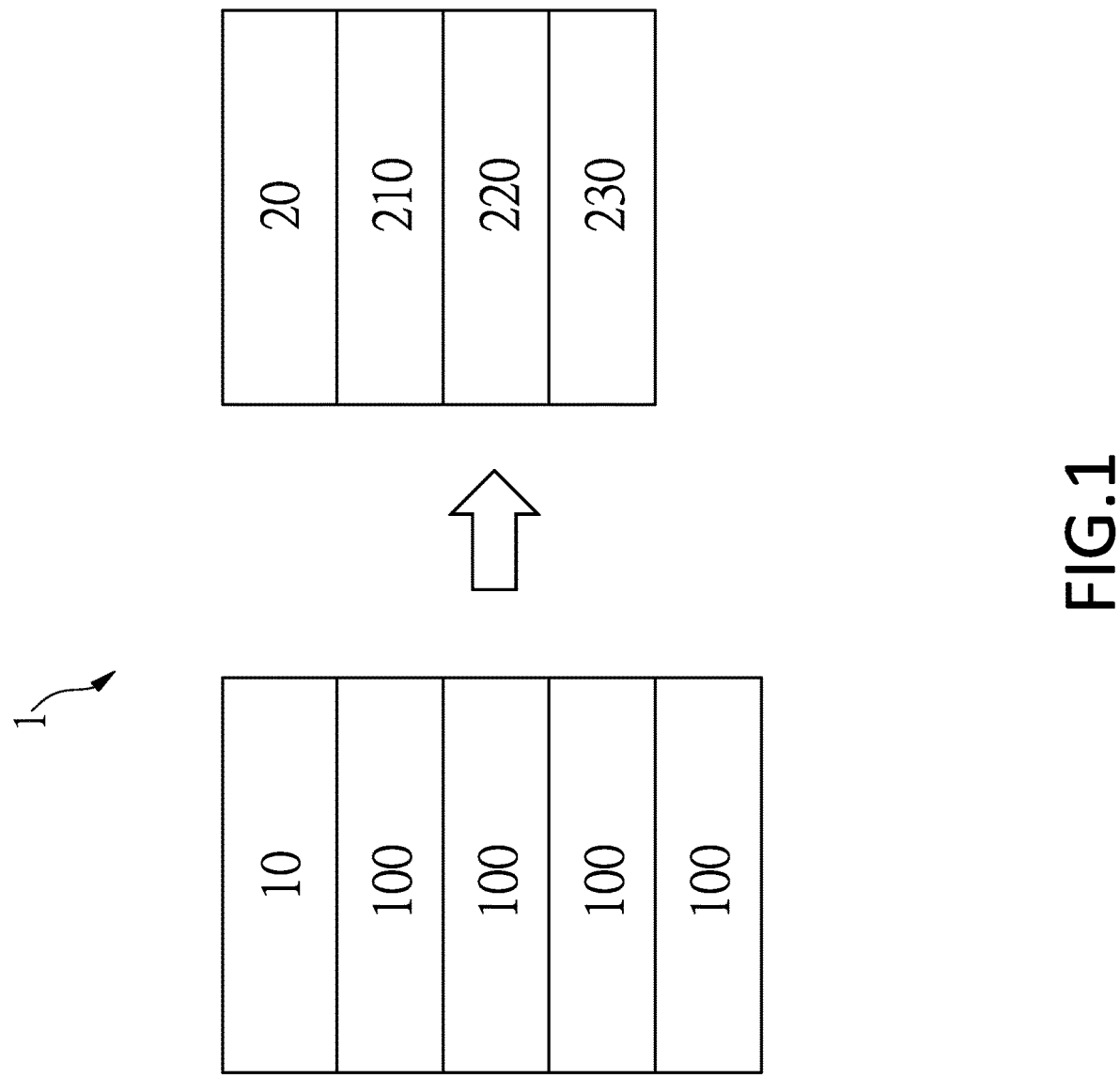
FIG. 1 illustrates a block diagram of the tire pressure detection system with separated antennas of the present invention.
Figure 2:
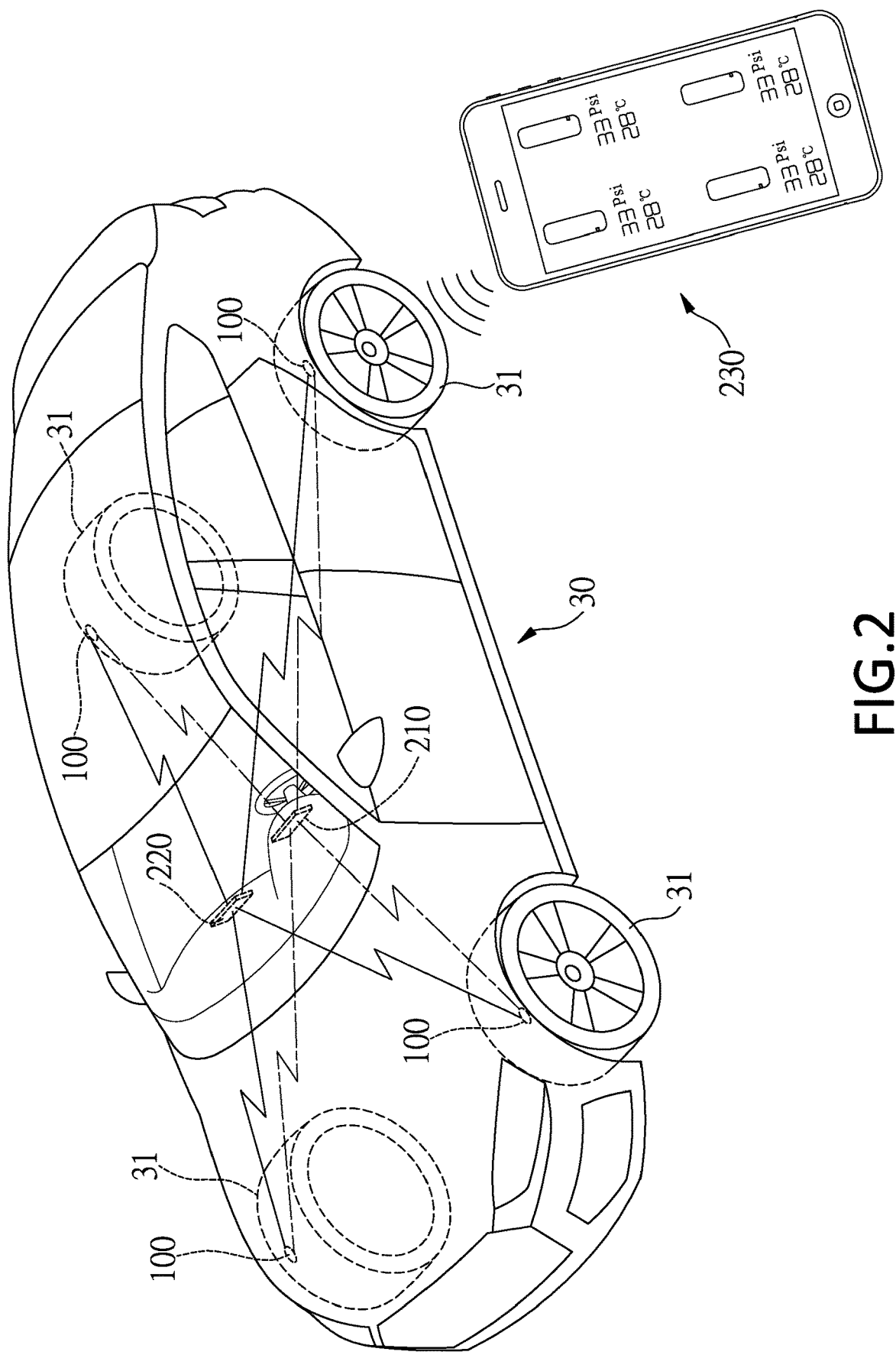
FIG. 2 illustrates that the tire pressure detector wirelessly sends transmission signals to the tire-pressure receiving device, the in-vehicle audio-video device and the mobile device
Figure 3:
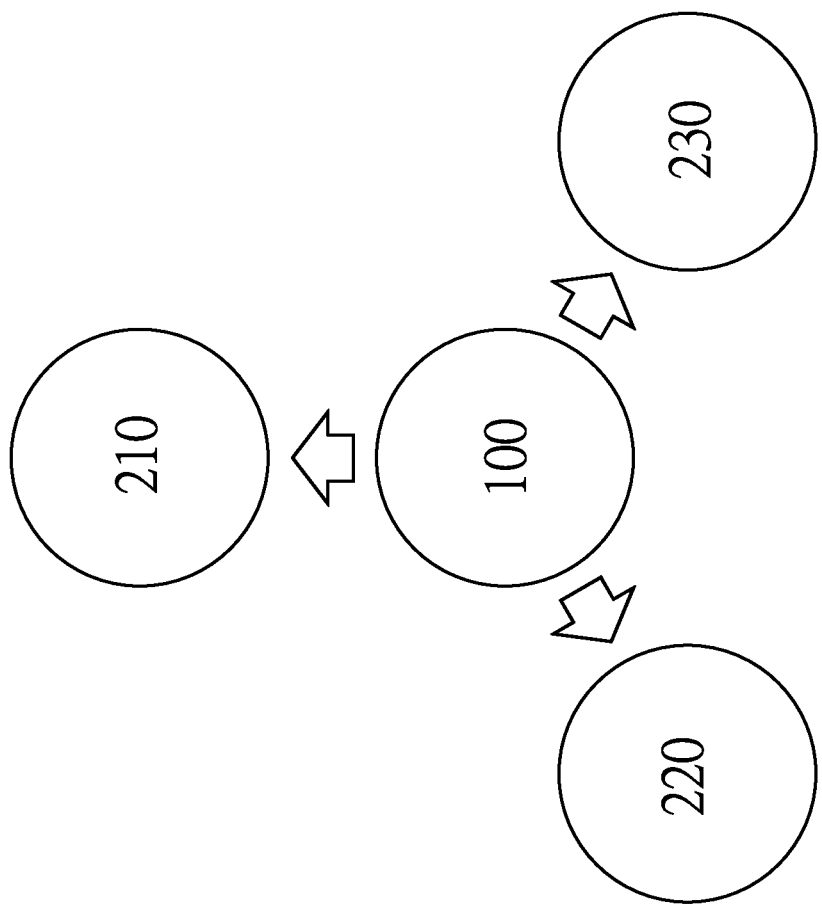
FIG. 3 illustrates that the tire pressure detector is connected with the tire-pressure receiving device, the in-vehicle audio-video device and the mobile device.
Figure 4:
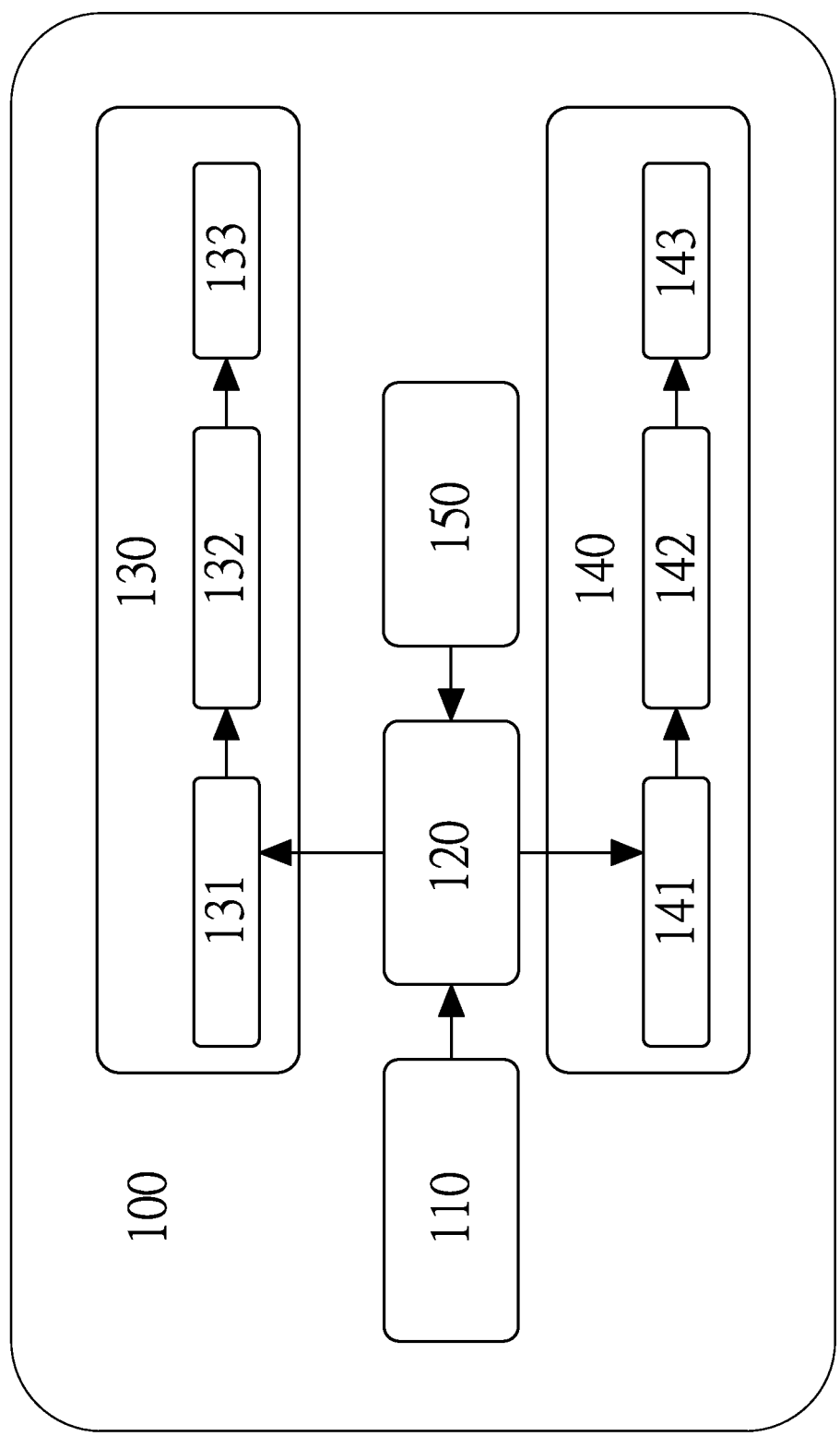
FIG. 4 illustrates a block diagram of the tire pressure detector of the present invention.
Figure 5:
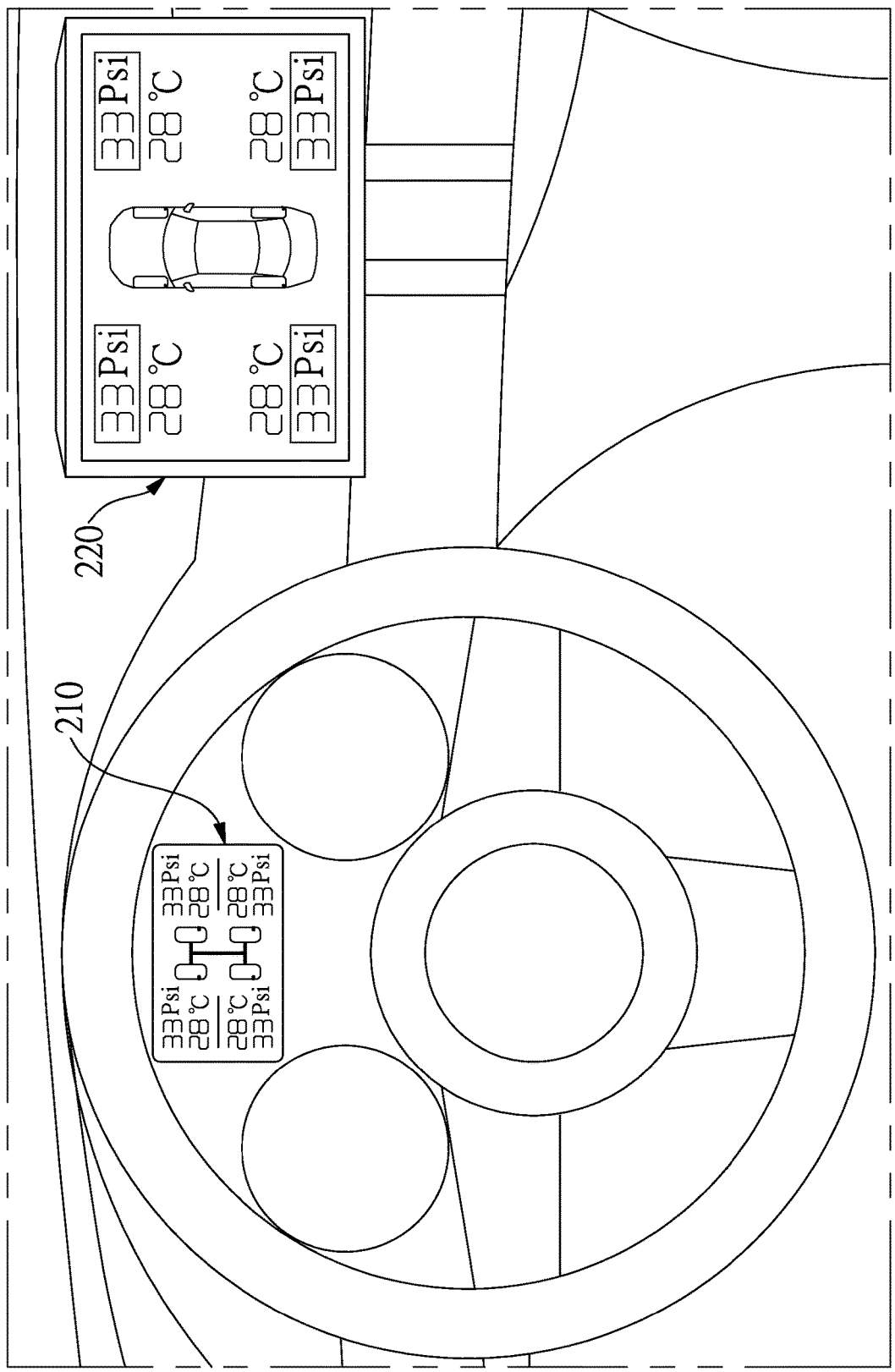
FIG. 5 shows that the tire-pressure receiving device and the in-vehicle audio-video device receive the tire status from the tire pressure detector.

Referring to FIGS. 1 to 5, the tire pressure detection system with separated antennas 1 of the present invention comprises a detection end 10 and a receiving end 20. The detection end 10 includes a plurality of tire pressure detectors 100. In this embodiment, there are four tire pressure detectors 100, by way of example, respectively installed to four tires 31 of a vehicle 30. The receiving end 20 includes a tire-pressure receiving device 210, an in-vehicle audio-video device 220 and a mobile device 230. The tire-pressure receiving device 210 is built in the vehicle 30 by the manufacturers. The in-vehicle audio-video device 220 can be a built-in equipment or an externally installed device. The mobile device 230 can be the user's small phone.

Each of the tire pressure detectors 100 includes a tire status detection unit 110, a main control unit 120, a radio frequency circuit 130 and a Bluetooth circuit 140. The main control unit 120 is electrically connected to the tire status detection unit 110, the radio frequency circuit 130 and the Bluetooth circuit 140. The tire status detection unit 110 continuously detects the tire status of each tire 31. The main control unit 120 converts the information regarding the detected tire status into a control transmission signal for output. The information regarding the tire status includes tire pressure and tire temperature.

The radio frequency circuit 130 includes a radio frequency control unit 131, a radio frequency matching unit 132 and a radio frequency antenna 133. The radio frequency matching unit 132 is electrically connected with the radio frequency control unit 131 and the radio frequency antenna 133. The radio frequency control unit 131 receives and converts the control transmission signal into a radio frequency signal. The radio frequency matching unit 132 modifies the control transmission signal to match a pre-set radio frequency impedance. Further, the radio frequency antenna 133 matches the radio frequency impedance for maximum power transfer and outputs the radio frequency signal within a corresponding frequency band to any one or any two or more of the tire-pressure receiving device 210, the in-vehicle audio-video device 220 and the mobile device 230 so as to display the tire status.

The Bluetooth circuit 140 includes a Bluetooth control unit 141, a Bluetooth matching unit 142 and a Bluetooth antenna 143. The Bluetooth matching unit 142 is electrically connected to the Bluetooth control unit 141 and the Bluetooth antenna 143. The Bluetooth control unit 141 receives and converts the control transmission signal into a Bluetooth signal. The Bluetooth matching unit 142 modulates the control transmission signal to match a pre-set Bluetooth impedance. The Bluetooth antenna 143 matches the Bluetooth impedance and outputs the Bluetooth signal within a corresponding frequency band to any one or any two or more of the tire-pressure receiving device 210, the in-vehicle audio-video device 220 and the mobile device 230 so as to display the tire status.

In use of the tire pressure detection system with separated antennas 1 of the present invention, the detection end 10 detects the tire status of the tire 31, such as the tire pressure and the tire interior temperature of the tire 31, by the tire status detection unit 110 of the tire pressure detector 100. For output of the detected information in the form of radio frequency signal and Bluetooth signal to the receiving end 20, the control transmission signal generated by the main control unit 120 is converted into the radio frequency signal and the Bluetooth signal, respectively, through the radio frequency circuit 130 and the Bluetooth circuit 140. The tire status is then displayed by the tire-pressure receiving device 210, the in-vehicle audio-video device 220 and the mobile device 230.

It is noted that the tire pressure detector 100 is configured to provide two types of signals, i.e. the radio frequency signal and the Bluetooth signal. Accordingly, in addition to the transmission to the built-in tire-pressure receiving device 210, the information of the tire status also can be displayed on the in-vehicle audio-video device 220 and the mobile device 230. In comparison with conventional technology, which can only transmit a single type of signal, the present invention does not require the installation of additional signal converters. Therefore, there are no issues related to occupying the cigarette lighter power supply socket or power socket, as well as taking up space inside the vehicle. This enables the achievement of the purpose and effectiveness of the present invention.

Figure 7:
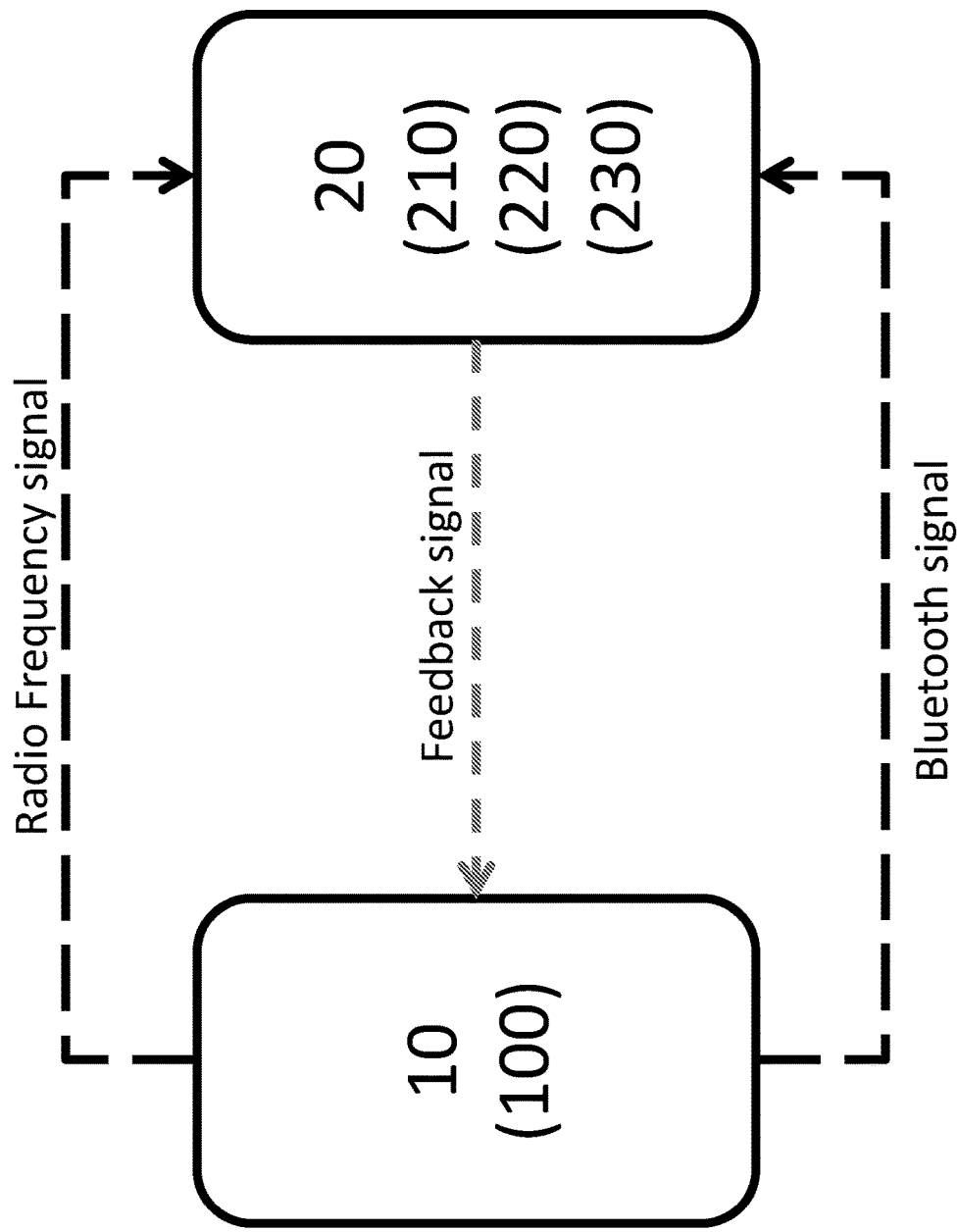
FIG. 7 shows a block diagram of a bidirectional transmission system of the present invention.

Further, the tire pressure detection system with separated antennas 1 of the present invention features the functionality of bidirectional transmission during operation. The bidirectional transmission of the present invention will now be discussed with reference to the FIG. 7.

When the tire pressure detectors 100 of the detection end 10 are activated in operation mode, upon receiving any one of the aforementioned radio frequency signal and Bluetooth signal, the receiving end 20 sends a feedback signal to the detection end 10 to stop output of unreceived signals. As a result, the tire pressure detectors 100 of the detection end 10 are switched from operation mode to power-saving mode, thereby reducing the transmission frequency of the tire pressure detector 100 of the detection end and achieving power efficiency and prolonging the usage time of the tire pressure detector 100.

When the tire pressure detectors 100 of the detection end 10 are activated in operation mode and outputs radio frequency signals and Bluetooth signals to the receiving end 20, if the receiving end 20 fails to complete signal reception within a specified time frame, a feedback signal indicating non-operation is sent to the detection end 10 by the receiving end 20. This prompts the tire pressure detectors 100 of the detection end 10 to switch from operation mode to positioning mode. In the positioning mode, the tire pressure detector 100 of the detection end 10 initiates a positioning procedure with the receiving end 20. Once the positioning process is completed there between, the receiving end 20 sends a feedback signal indicating positioning completion to the detection end 10. As a result, the tire pressure detector 100 of the detection end 10 switches from positioning mode back to operation mode.

For the Bluetooth signal as the example of the feedback signal, the transmission between the detection end 10 and the receiving end 20 in the present invention is a bidirectional Bluetooth transmission.

Hereafter are detailed features of all components in the present invention and operation mechanism thereof. Specifically, the radio frequency signal is a 315 MHz or 433.92 MHz transmission signal, and the Bluetooth signal is a 2.4 GHz transmission signal.

The main control unit 120 sends the control transmission signal to the radio frequency control unit 131 and the Bluetooth control unit 141 in combinations of two or more of a pre-set sequence, a pre-set number of times and a pre-set of time interval.

In addition, each of the tire pressure detectors 100 includes a calling unit 150 which is electrically connected to the main control unit 120.

Figure 6:
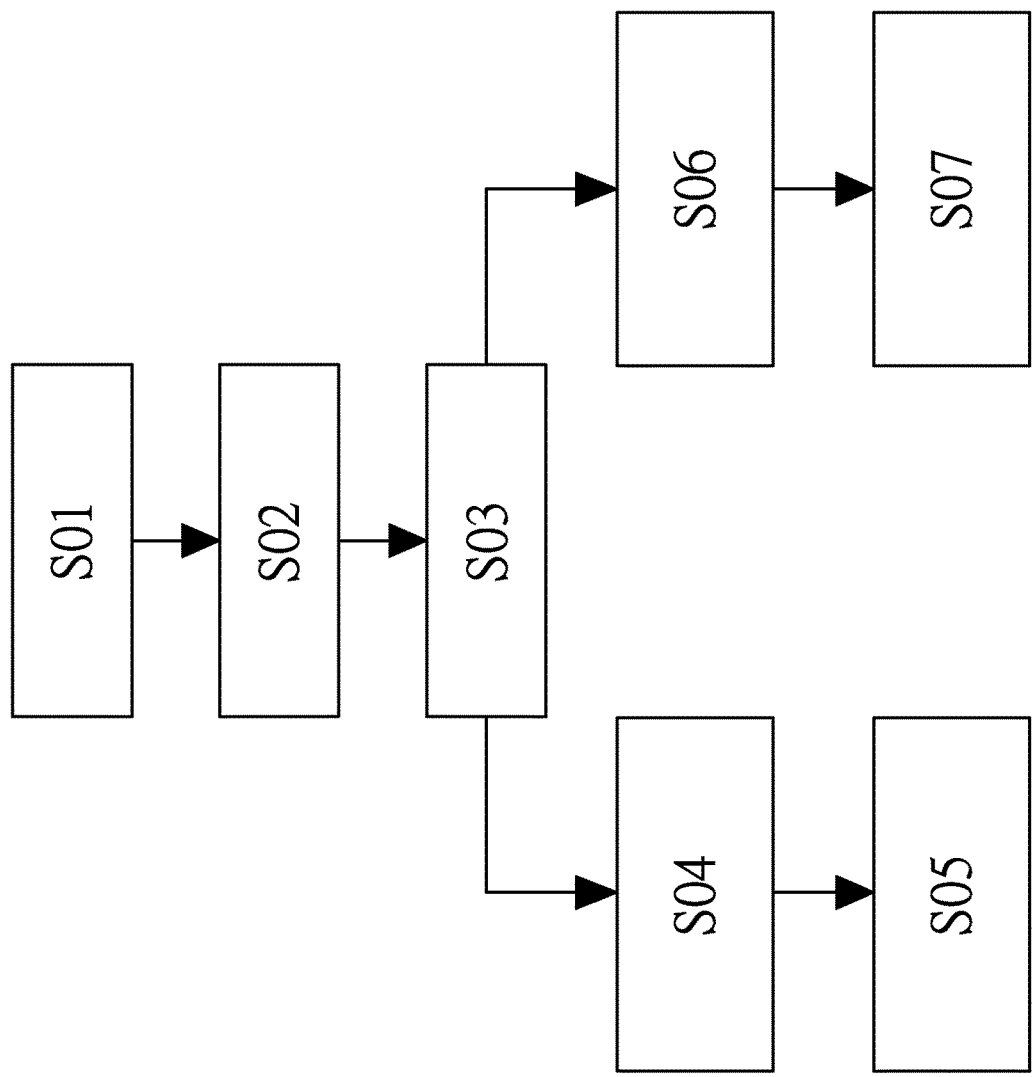
FIG. 6 shows the steps of the tire pressure detection system with separated antennas of the present invention.

As shown in FIG. 6, the operation of the tire pressure detection system with separated antennas 1 includes the following steps.

In the calling step S01, the calling unit 150 of the tire pressure detector 100 is activated from hibernation mode into monitoring mode in response to vibration or centrifugal force.

In the detection step S02, after the tire detection detector 100 is activated, the main control unit 120 demands the tire status detection unit 110 to continuously detect the tire pressure and the interior temperature of the tire 31 so as to obtain information of the tire status, followed by converting the information of the tire status into a control transmission signal for output.

In the setting step S03, the main control unit 120 sends the control transmission signal to the radio frequency control unit 131 and the Bluetooth control unit 141 based on a combination of two or more two among a pre-set sequence, a pre-set number of times and a pre-set of time interval.

In the radio frequency signal matching step S04, for output of a radio frequency signal, the radio frequency control unit 131 receives and converts the control transmission signal into a radio frequency signal, and the radio frequency matching unit 132 adjusts the control transmission signal to match a pre-set radio frequency impedance.

In the radio frequency signal output step S05, the radio frequency antenna 133 matches the radio frequency impedance for maximum power transfer and outputs the radio frequency signal within a corresponding frequency band to any one or any two or more of the tire-pressure receiving device 210, the in-vehicle audio-video device 220 and the mobile device 230 so as to display the tire status.

In the Bluetooth signal matching step S06, for output of Bluetooth signal, the Bluetooth control unit 141 receives and converts the control transmission signal into Bluetooth signal, and tunes the control transmission signal to match a pre-set Bluetooth impedance.

In the Bluetooth signal output step S07, the Bluetooth antenna 143 matches the Bluetooth impedance for maximum power transfer and outputs the Bluetooth signal within a corresponding frequency band to the tire-pressure receiving device 210, the in-vehicle audio-video device 220 and the mobile device 230 so as to display the tire status.

While we have shown and described the embodiment in accordance with the present invention, it should be clear to those skilled in the art that further embodiments may be made without departing from the scope of the present invention.

What is claimed is:

1. A tire pressure detection system with separated antennas, comprising:
    a detection end and a receiving end, the detection end including a plurality of tire pressure detectors, and the receiving end including a tire-pressure receiving device, an in-vehicle audio-video device and a mobile device, wherein:
    each of the tire pressure detectors includes a tire status detection unit, a main control unit, a radio frequency circuit and a Bluetooth circuit;
    the main control unit is electrically connected to the tire status detection unit, the radio frequency circuit and the Bluetooth circuit;
    the tire status detection unit continuously detects a tire status when being in operation mode;
    the main control unit, upon receiving an information of the tire status from the tire status detection unit, converts the information of the tire status into a control transmission signal for output; the radio frequency circuit includes a radio frequency control unit, a radio frequency matching unit and a radio frequency antenna;
    the radio frequency matching unit is electrically connected to the radio frequency control unit and the radio frequency antenna;
    the radio frequency control unit, upon receiving the control transmission signal, converts the control transmission signal into a radiofrequency signal;
    the radio frequency matching unit, upon signal reception from the radio frequency control unit, adjusts the control transmission signal to match a pre-set radio frequency impedance;
    the radio frequency antenna matches the pre-set radio frequency impedance for maximum power transfer, and allows for output of the radio frequency signal within a corresponding frequency band to any one or any two or more of the tire-pressure receiving device, the in-vehicle audio-video device and the mobile device so as to display the tire status;
    the Bluetooth circuit includes a Bluetooth control unit, a Bluetooth matching unit and a Bluetooth antenna;
    the Bluetooth matching unit is electrically connected to the Bluetooth control unit and the Bluetooth antenna;
    the Bluetooth control unit, upon receiving the control transmission signal, converts the control transmission signal into a Bluetooth signal;
    the Bluetooth matching unit, upon signal reception from the Bluetooth control unit, adjusts the control transmission signal to match a pre-set Bluetooth impedance;
    the Bluetooth antenna matches the pre-set Bluetooth impedance for maximum power transfer, and allows for output of the Bluetooth signal within a corresponding frequency band to any one or any two or more of the tire-pressure receiving device, the in-vehicle audio-video device and the mobile device so as to display the tire status;
    when the tire pressure detectors of the detection end are activated in the operation mode, the receiving end, upon receiving any one of the radio frequency signal and the Bluetooth signal, sends a feedback signal to the detection end to stop output of unreceived signals, so that the tire pressure detectors of the detection end are switched from the operation mode to power-saving mode so as to reduce transmission frequency of the detection end;
    when the tire pressure detectors of the detection end are activated in the operation mode and outputs the radio frequency signal and the Bluetooth signal to the receiving end, the receiving end, upon failure of completing signal reception within a specified time frame, sends a feedback signal indicating non-operation to the detection end, causing the tire pressure detectors of the detection end to switch from the operation mode to positioning mode and initiating a positioning procedure with the receiving end.

2. The tire pressure detection system with separated antennas as claimed in claim 1, wherein the radio frequency signal is a 315 MHz or 433.92 MHz transmission signal, the Bluetooth signal is a 2.4 GHz transmission signal, and the tire status includes tire pressure and tire temperature.

3. The tire pressure detection system with separated antennas as claimed in claim 1, wherein each of the tire pressure detectors includes a calling unit which is electrically connected to the main control unit.

4. The tire pressure detection system with separated antennas as claimed in claim 1, wherein the main control unit sends the control transmission signal to the radio frequency control unit and the Bluetooth control unit based on a pre-set sequence.

5. The tire pressure detection system with separated antennas as claimed in claim 1, wherein the main control unit sends the control transmission signal to the radio frequency control unit and the Bluetooth control unit based on a pre-set number of times.

6. The tire pressure detection system with separated antennas as claimed in claim 1, wherein the main control unit sends the control transmission signal to the radio frequency control unit and the Bluetooth control unit based on a pre-set of time interval.

7. The tire pressure detection system with separated antennas as claimed in claim 1, wherein the main control unit sends the control transmission signal to the radio frequency control unit and the Bluetooth control unit based on a combination of two or more of a pre-set sequence, a pre-set number of times and a pre-set of time interval.

* * * * *